United States Patent
Krah

(10) Patent No.: US 7,920,134 B2
(45) Date of Patent: Apr. 5, 2011

(54) PERIODIC SENSOR AUTOCALIBRATION AND EMULATION BY VARYING STIMULUS LEVEL

(75) Inventor: Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 903 days.

(21) Appl. No.: 11/818,263

(22) Filed: Jun. 13, 2007

(65) Prior Publication Data

US 2008/0309622 A1    Dec. 18, 2008

(51) Int. Cl.
*G09G 5/00*    (2006.01)
(52) U.S. Cl. .................................. 345/178; 178/18.06
(58) Field of Classification Search .................. 345/173, 345/178, 174; 178/18.06, 18.05, 18.07
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,456,952 B1 * | 9/2002 | Nathan | 702/94 |
| 6,556,935 B2 * | 4/2003 | Morimura et al. | 702/104 |
| 6,583,676 B2 | 6/2003 | Krah et al. | |
| 6,690,387 B2 | 2/2004 | Zimmerman et al. | |
| 6,977,646 B1 * | 12/2005 | Hauck et al. | 345/173 |
| 7,015,894 B2 | 3/2006 | Morohoshi | |
| 7,158,122 B2 * | 1/2007 | Roberts | 345/173 |
| 7,184,064 B2 | 2/2007 | Zimmerman et al. | |
| 7,337,085 B2 | 2/2008 | Soss | |
| 7,362,313 B2 * | 4/2008 | Geaghan et al. | 345/173 |

(Continued)

FOREIGN PATENT DOCUMENTS

| | | | |
|---|---|---|---|
| JP | 2000/163031 A | 6/2000 |
| JP | 2002/342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Regina Liang
*Assistant Examiner* — Tom V Sheng
(74) *Attorney, Agent, or Firm* — Morrison & Foerster LLP

(57) ABSTRACT

The automatic calibration of a sensor panel is disclosed by varying the amplitude of an input stimulus Vstim to simulate a full-touch condition and calibrating each pixel of the sensor panel in accordance with the difference between the simulated full-touch condition and a baseline full-touch condition. To accomplish this, a baseline full scale output FS_targ_cal can be measured at during pre-delivery calibration for each pixel using a test fixture capable of applying a no-touch to full-touch condition given a nominal Vstim. A full-touch condition can then be emulated for each pixel by lowering Vstim until the current full scale output FS_targ_current equals FS_targ_cal, and determining the Vstim value Vstim_cal at that point. During field calibration, Vstim_cal can be applied to each pixel to simulate a full-touch condition, and FS_targ_current can be obtained and compared against FS_targ_cal. Each analog channel can then be tuned so that in subsequent full-touch conditions, FS_targ_current will approximately equal FS_targ_cal.

22 Claims, 10 Drawing Sheets

U.S. PATENT DOCUMENTS

| | | | |
|---|---|---|---|
| 7,571,065 B2 * | 8/2009 | Seesink | 702/85 |
| 7,663,607 B2 | 2/2010 | Hotelling et al. | |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2008/0157867 A1 | 7/2008 | Krah | |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

PERIODIC SENSOR AUTOCALIBRATION AND EMULATION BY VARYING STIMULUS LEVEL

FIELD OF THE INVENTION

This relates to sensor panels used as input devices for computing systems, and more particularly, to the automatic calibration of a sensor panel by varying the amplitude of an input stimulus to the sensor panel.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of or integral with a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Some touch panels can detect multiple touches (the touching of fingers or other objects upon a touch-sensitive surface at distinct locations at about the same time) and near touches (fingers or other objects within the near-field detection capabilities of their touch sensors), and identify and track the locations of the touches. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

As mentioned above, a display screen can be located beneath the sensor panel. A user interface (UI) algorithm can generate a virtual keypad or other virtual input interface beneath the sensor panel that can include virtual buttons, pull-down menus and the like. By detecting touch events at locations defined by the virtual buttons, the UI algorithm can determine that a virtual button has been "pushed." The magnitude of analog channel output values, indicating the "degree" of touch, can be used by the UI algorithm to determine whether there was a sufficient amount of touch to trigger the pushing of the virtual button.

Ideally, a particular amount of touch should generate an analog channel output value of the same magnitude regardless of where the touch event occurred on a sensor panel. However, because the electrical characteristics of the sensors in a sensor panel are likely to vary due to processing variations, manufacturing tolerances, assembly differences (which can be due to the location of the sensors in relation to the edges and shape of the sensor panel), aging, stress, dirt, moisture, deformation due to pressure, temperature, expansion of materials and geometries, and the like, the magnitude of the analog channel output values can vary from location to location within the sensor panel. This can lead to inconsistent or false triggering of virtual buttons or non-triggering of virtual buttons, and a difficult user experience as the user discovers that certain areas of the sensor panel require more or less touching in order to trigger a virtual button.

SUMMARY OF THE INVENTION

This relates to the automatic calibration of a sensor panel by varying the amplitude of an input stimulus to simulate a full-touch condition, and then calibrating the sensor panel in accordance with the difference between the simulated full-touch condition and a baseline full-touch condition.

The electrical characteristics of the sensors (pixels) in a sensor panel can vary due to processing variations, manufacturing tolerances, assembly differences (which can be due to the location of the sensors in relation to the edges and shape of the sensor panel), aging, stress, dirt, moisture, deformation due to pressure, temperature, expansion of materials and geometries, and the like. Thus, it can be desirable to account for sensor panel variations by calibrating the pixels in a sensor panel such that for a given amount of touch, the analog channel ADC outputs will behave similarly.

To accomplish this, a baseline full scale (i.e. full touch) ADC output (FS_targ_cal) of an analog channel can be measured before customer delivery, such as at the factory, for a particular pixel using a test fixture that can be capable of applying a no-touch to full-touch condition to each pixel in the sensor panel given a nominal Vstim amplitude. Note that this time before customer delivery can be referred to herein as "pre-delivery." A full-touch condition can then be emulated by lowering Vstim until the ADC output for the pixel (FS_targ_current) equals FS_targ_cal. This lowered Vstim value (Vstim_cal) for each pixel can be saved for use during field calibration.

During field calibration, Vstim can be set to Vstim_cal to simulate a full-touch condition, and FS_targ_current can be obtained and compared against FS_targ_cal. Ideally, FS_targ_cal should equal FS_targ_current. However, the two values may not be equal because FS_targ_current is affected by (1) temp, (2) panel geometry (due to temperature effects, deformation, aging), (3) panel contaminants (e.g. dirt on panel surface, humidity, etc.), (4) panel subsystem specifics (e.g. temperature, noise), and other factors as described above.

Each analog channel can then be tuned such that when a full-touch condition is thereafter applied to a particular pixel by a user during normal use, the resultant FS_targ_current will approximately equal FS_targ_cal. Any method known to those skilled in the art can be used to tune the analog channels such that FS_targ_current will approximately equal FS_targ_cal.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the automatic calibration of a sensor panel by varying the amplitude of an input stimulus to simulate a full-touch condition, and then calibrating the sensor panel in accordance with the difference between the simulated full-touch condition and a baseline full-touch condition.

Figure 1:
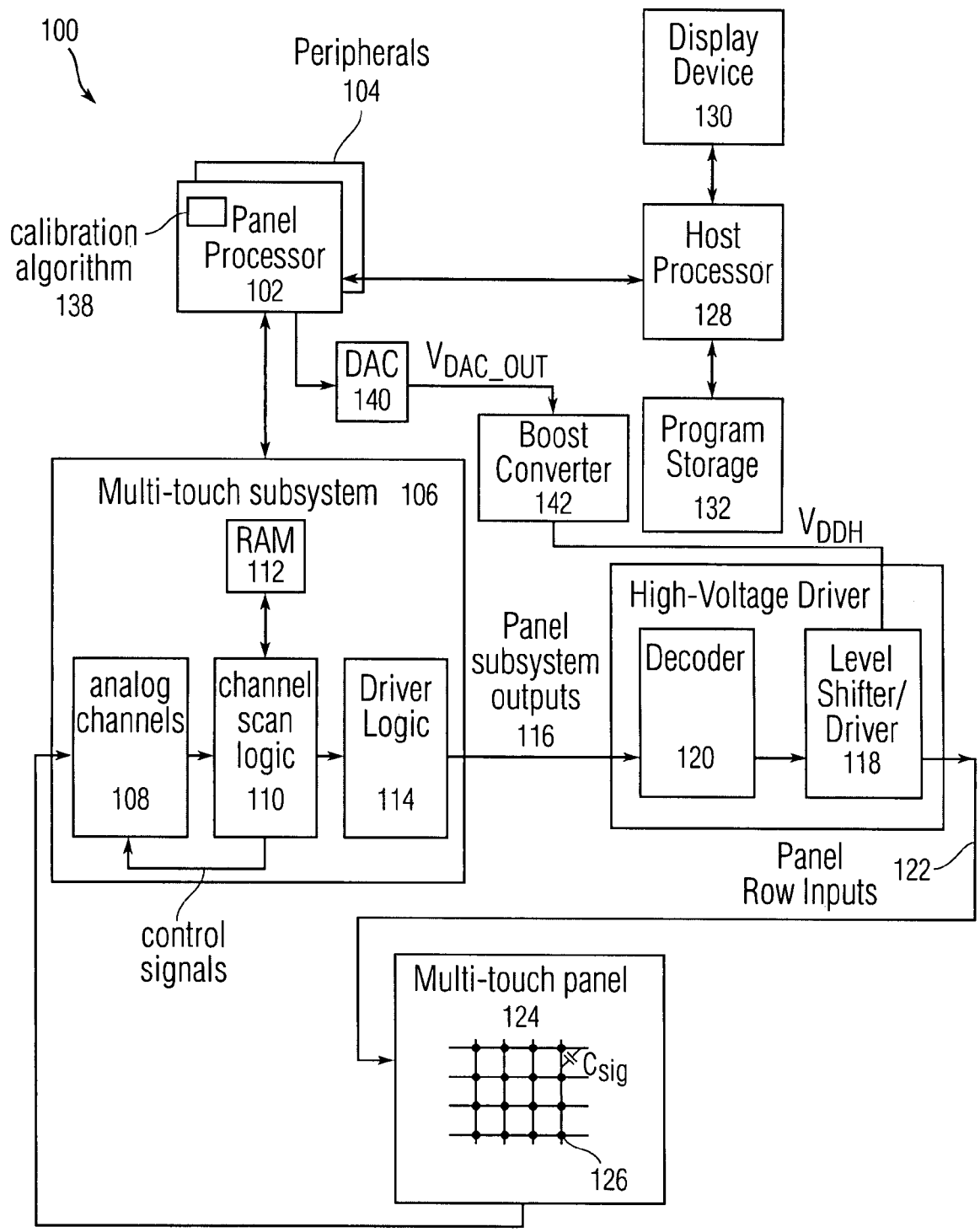
FIG. 1 illustrates an exemplary computing system using a multi-touch panel input device according to one embodiment of this invention.

FIG. 1 illustrates exemplary computing system 100 operable with multi-touch sensor panel 124. Multi-touch sensor panel 124 can detect multiple touches (touch events or contact points) that occur at about the same time (and at different times), and computing system 100 can identify and track the locations of the touches. Computing system 100 can include one or more panel processors 102 and peripherals 104, panel subsystem 106, and a high-voltage driver. One or more processors 102 can include, for example, ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 to analog channels 108. In addition, channel scan logic 110 can control the driver logic and stimulation signals being selectively applied to rows of multi-touch panel 124. Calibration algorithm 138, implemented in software or firmware and executed by panel processor 102, can be used to perform sensor panel calibration according to embodiments of the invention. In some embodiments, panel subsystem 106, panel processor 102 and peripherals 104 can be integrated into a single application specific integrated circuit (ASIC).

Driver logic 114 can provide multiple multi-touch subsystem outputs 116 and can present a proprietary interface that drives high voltage driver, which can be comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Level shifter and driver 118 can receive its supply voltage $V_{DDH}$ from boost converter 142, which can be controlled by $V_{DAC\_OUT}$ from digital-to-analog converter (DAC) 140, which in turn can be controlled by panel processor 102. Boost converter 142 is capable of proportionately amplifying $V_{DAC\_OUT}$ to a higher voltage level and changing the amplitude of a stimulus waveform Vstim applied to panel row inputs 122.

Decoder 120 can decode drive interface signals to one out of N outputs, whereas N is the maximum number of rows in the panel. Decoder 120 can be used to reduce the number of drive lines needed between the high voltage driver and multi-touch panel 124. Each panel row input 122 can drive one or more rows in multi-touch panel 124. In some embodiments, high voltage driver 118 and decoder 120 can be integrated into a single ASIC. However, in other embodiments high voltage driver 118 and decoder 120 can be integrated into driver logic 114, and in still other embodiments high voltage driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

Multi-touch panel 124 can in some embodiments include a capacitive sensing medium having a plurality of row traces or driving lines and a plurality of column traces or sensing lines.

The row and column traces can be formed from a transparent conductive medium such as Indium Tin Oxide (ITO) or Antimony Tin Oxide (ATO), although other non-transparent materials such as copper can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials such as Mylar. An additional dielectric cover layer can be placed over the row or column traces to strengthen the structure and protect the entire assembly from damage.

At the "intersections" of the traces, where the traces pass above and below each other (but do not make direct electrical contact with each other), the traces can essentially form two electrodes. Each intersection of row and column traces can represent a capacitive sensing node and can be viewed as picture element (pixel) 126, which can be particularly useful when multi-touch panel 124 is viewed as capturing an "image" of touch. (In other words, after panel subsystem 106 has determined whether a touch event has been detected at each touch sensor in multi-touch panel 124, the pattern of touch sensors in the multi-touch panel at which a touch event occurred can be viewed as an "image" of touch (e.g. a pattern of fingers touching the panel).) When the two electrodes are at different potentials, each pixel can have an inherent self or mutual capacitance formed between the row and column electrodes of the pixel. If an AC signal is applied to one of the electrodes, such as by exciting the row electrode with an AC voltage at a particular frequency, an electric field and an AC or signal capacitance can be formed between the electrodes, referred to as Csig. The presence of a finger or other object near or on multi-touch panel 124 can be detected by measuring changes to Csig. The columns of multi-touch panel 124 can drive one or more analog channels 108 in panel subsystem 106. In some embodiments, each column can be coupled to one dedicated analog channel 108. However, in other embodiments, the columns can be couplable via an analog switch to a fewer number of analog channels 108.

Figure 2A:
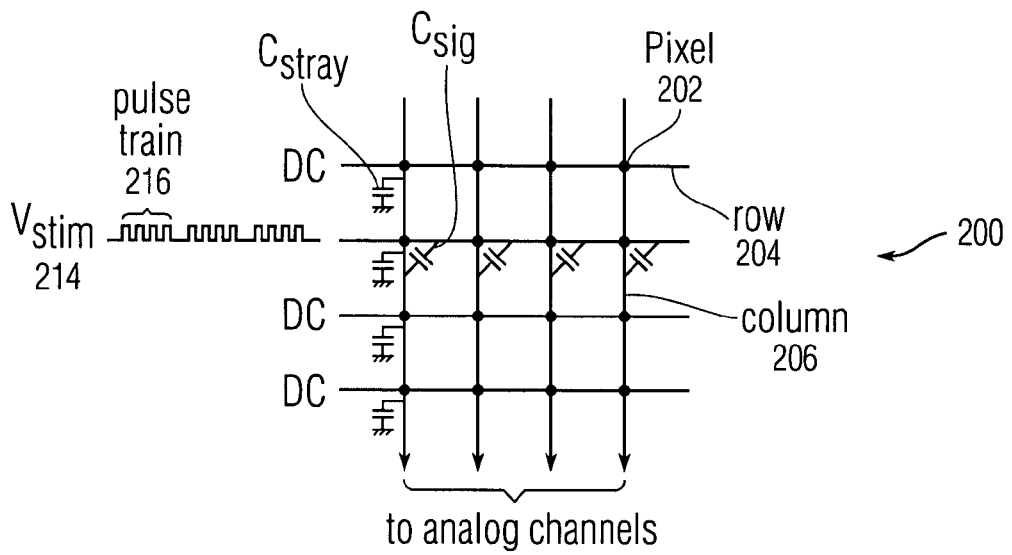
FIG. 2a illustrates an exemplary capacitive multi-touch panel according to one embodiment of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 can be applied to one row, with all other rows connected to DC. The stimulus causes a charge to be injected into the column electrodes through mutual capacitance at the intersecting points. This charge is Qsig=Csig*Vstim. Each of columns 206 can be selectively connectable to one or more analog channels (see analog channels 108 in FIG. 1).

Figure 2B:
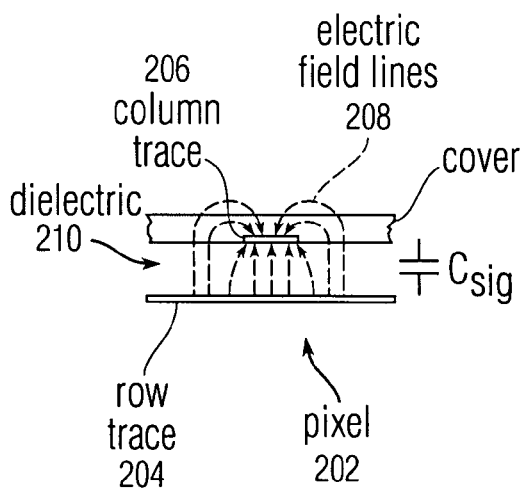
FIG. 2b is a side view of an exemplary capacitive touch sensor or pixel in a steady-state (no-touch) condition according to one embodiment of this invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
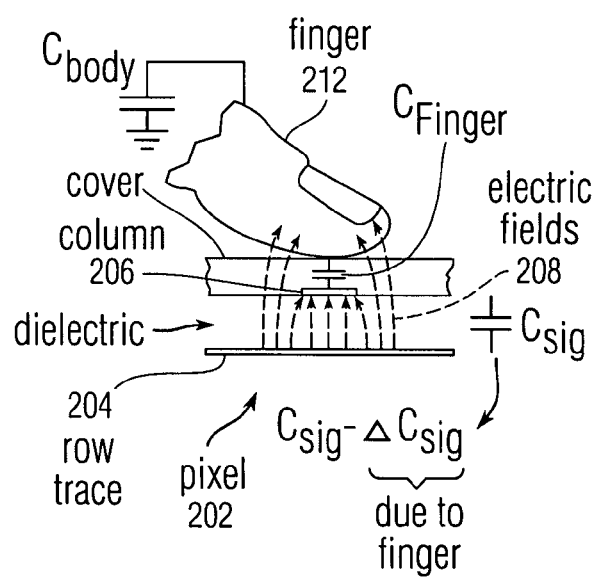
FIG. 2c is a side view of the exemplary capacitive touch sensor or pixel in a dynamic (touch) condition according to one embodiment of this invention.

FIG. 2c is a side view of exemplary pixel 202 in a dynamic (touch) condition. In FIG. 2c, finger 212 has been placed near pixel 202. Finger 212 can be a low-impedance object at signal frequencies, and has an AC capacitance Cfinger from the column trace 204 to the body. The body has a self-capacitance to ground Cbody of several hundred picofarads, where Cbody can be much larger than Cfinger. If finger 212 blocks some electric field lines 208 between the row and column electrodes (those fringing fields that exit the dielectric and pass through the air above the row electrode), those electric field lines can be shunted to ground through the capacitance path inherent in the finger and the body, and as a result, the steady state signal capacitance Csig can be reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields and resulting in a reduced net signal capacitance. The signal capacitance at the pixel can become Csig–ΔCsig, where Csig represents the static (no touch) component and ΔCsig represents the dynamic (touch) component. Note that Csig–ΔCsig will generally be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel can be divided into two or more sections, with Vstim signal 214 being simultaneously applied to one row in each section and all other rows in that region section held at a DC voltage.

Each analog channel coupled to a column can measure the mutual capacitance formed between that column and the row. This mutual capacitance can be comprised of the signal capacitance Csig and any change Csig_sense in that signal capacitance due to the presence of a finger, palm or other body part or object. These column values provided by the analog channels can be provided in parallel while a single row is being stimulated, or can be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
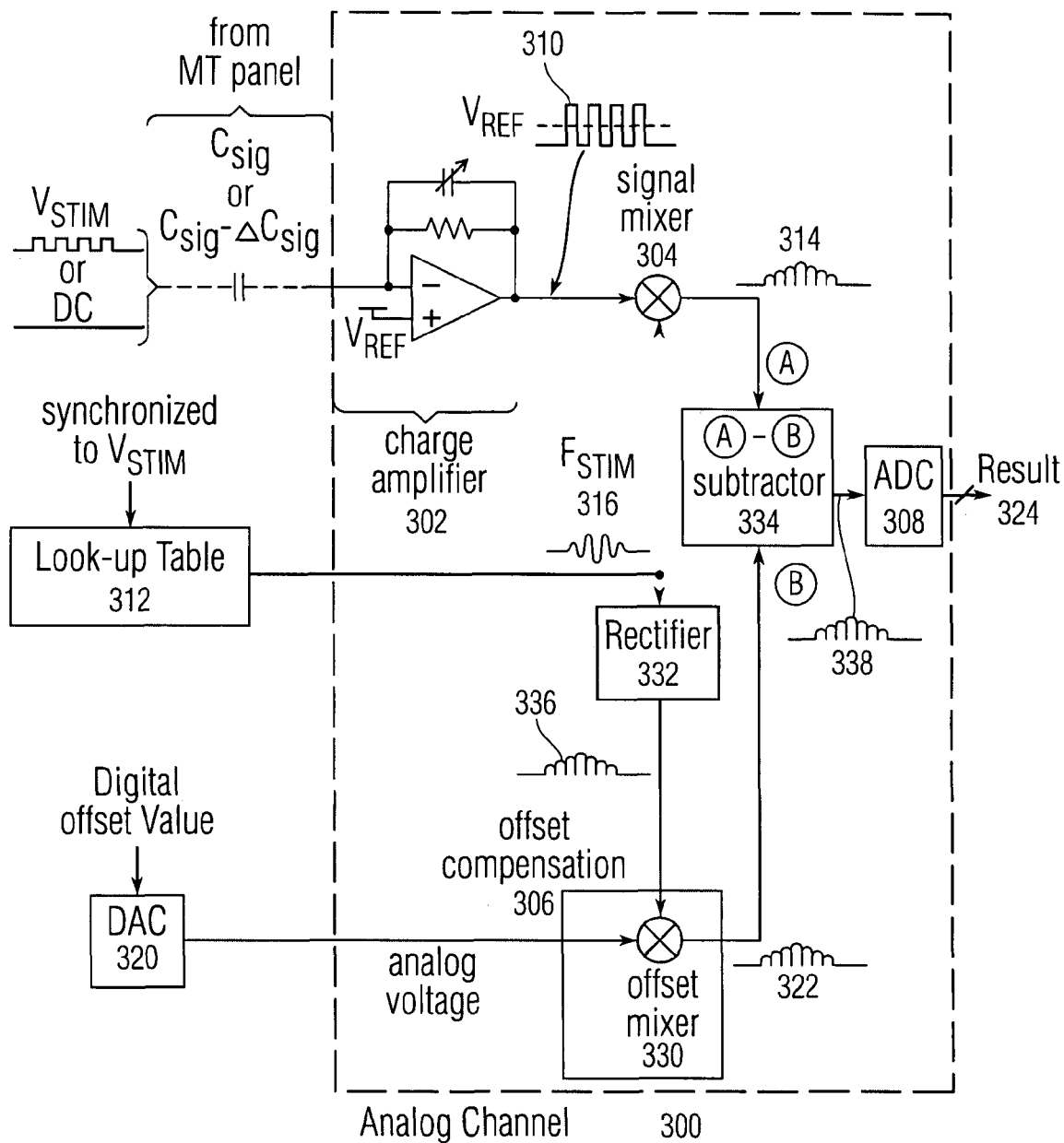
FIG. 3a illustrates an exemplary analog channel (also known as an event detection and demodulation circuit) according to one embodiment of this invention.

FIG. 3a illustrates exemplary analog channel or event detection and demodulation circuit 300. One or more analog channels 300 can be present in the multi-touch subsystem. One or more columns from a multi-touch panel can be connectable to each analog channel 300. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302. For example, if Vstim includes 18V p-p pulses and the gain of the charge amplifier is 0.1, then the output of the charge amplifier can be 1.8V p-p pulses. This output can be mixed in signal mixer 304 with demodulation waveform Fstim 316.

Because Vstim can create undesirable harmonics, especially if formed from square waves, demodulation waveform Fstim 316 can be a Gaussian sine wave in an otherwise DC signal that can be digitally generated from look-up table (LUT) 312 or other digital logic and synchronized to Vstim. In some embodiments, Fstim 316 can be tunable in frequency and amplitude by selecting different digital waveforms in LUT 312 or generating the waveforms differently using other digital logic. Signal mixer 304 can demodulate the output of charge amplifier 310 by subtracting Fstim 316 from the output to provide better noise rejection. Signal mixer 304 can reject all frequencies outside the passband, which can in one example be about +/−30 kHz around Fstim. This noise rejection can be beneficial in noisy environment with many sources of noise, such as 802.11, Bluetooth and the like, all having some characteristic frequency that can interfere with the sensitive (femtofarad level) analog channel 300. Signal mixer 304 can be essentially a synchronous rectifier as the frequency of the signal at its inputs is the same, and as a result, signal mixer output 314 can be essentially a rectified Gaussian sine wave.

Offset compensation 306 can then be applied to signal mixer output 314, which can remove the effect of the static Csig, leaving only the effect of ΔCsig appearing as result 324. Offset compensation 306 can be implemented using offset mixer 330. Offset compensation output 322 can be generated by rectifying Fstim 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the AC capacitance ΔCsig that occurs when a capacitive sensor on the row being stimulated has been touched. Subtractor output 338 can then be integrated and converted to a digital value by ADC 308. In some embodiments, integrator and ADC functions can be combined and ADC 308 can be an integrating ADC, such as a sigma-delta ADC, which can sum a number of consecutive digital values and average them to generate result 324.

Figure 3B:
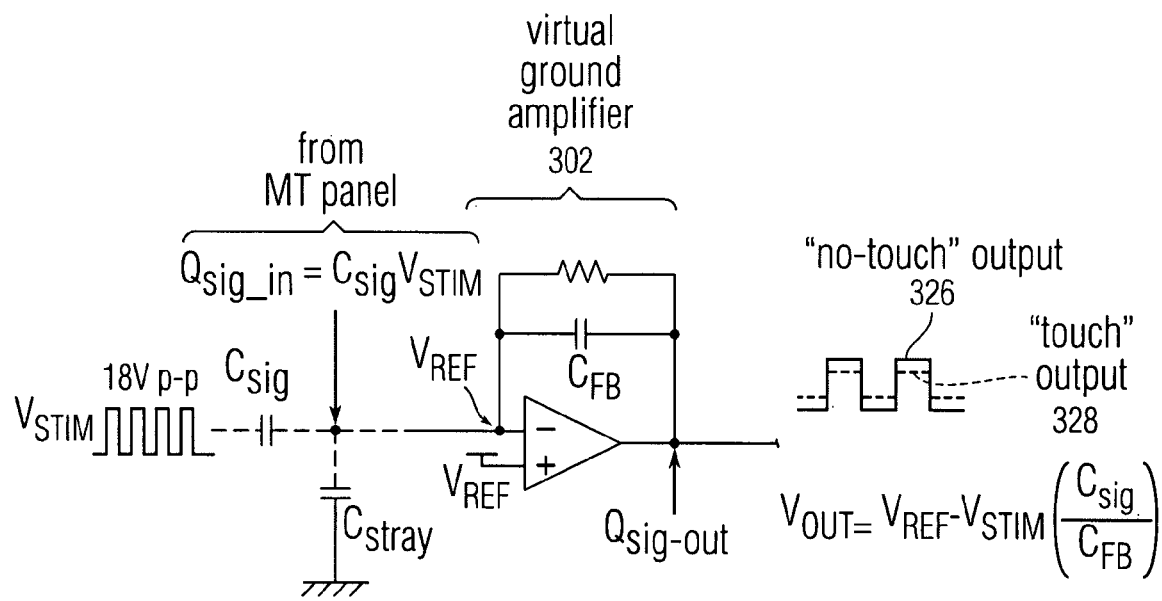
FIG. 3b is a more detailed illustration of a virtual ground charge amplifier at the input of an analog channel, and the capacitance contributed by a capacitive touch sensor and seen by the charge amplifier according to one embodiment of this invention.

FIG. 3b is a more detailed view of charge amplifier (a virtual ground amplifier) 302 at the input of an analog channel, and the capacitance that can be contributed by the multi-touch panel (see dashed lines) and seen by the charge amplifier. As mentioned above, there can be an inherent stray capacitance Cstray at each pixel on the multi-touch panel. In virtual ground amplifier 302, with the + (noninverting) input tied to Vref, the − (inverting) input can also be driven to Vref, and a DC operating point can be established. Therefore, regardless of how much Csig is present, the − input is always driven to Vref. Because of the characteristics of virtual ground amplifier 302, any charge Qstray that is stored in Cstray is constant, because the voltage across Cstray can be kept constant by the charge amplifier. Therefore, no matter how much stray capacitance Cstray is added to the − input, the net charge into Cstray will always be zero. Therefore the input charge Qsig_in=Csig*Vstim is zero when the corresponding row is kept at DC and is purely a function of Csig and Vstim when the corresponding row is stimulated. In either case, because there is no net charge into Cstray, the latter is rejected, and it essentially drops out of any equations. Thus, even with a hand over the multi-touch panel, although Cstray can increase, the output will be unaffected by the change in Cstray.

The gain of virtual ground amplifier 302 is usually small (e.g. 0.1) and can be equivalent to the ratio of Csig (e.g. 2 pF) and feedback capacitor Cfb (e.g. 20 pF). The adjustable feedback capacitor Cfb can convert the charge Qsig to the voltage Vout. Therefore, the output Vout of virtual ground amplifier 302 is a voltage that can be equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

Figure 3C:
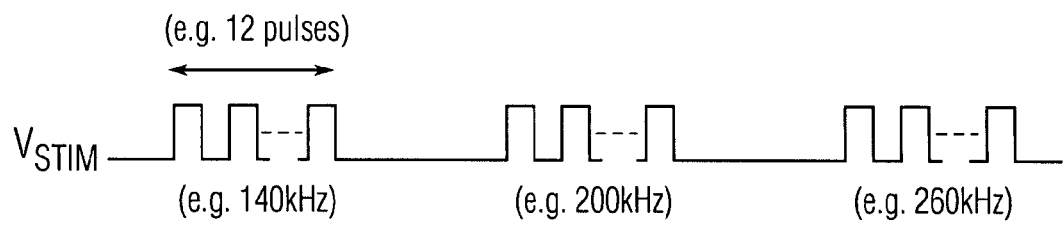
FIG. 3c illustrates an exemplary Vstim signal with multiple pulse trains each having a fixed number of pulses, each pulse train having a different frequency Fstim according to one embodiment of this invention.

FIG. 3c illustrates an exemplary Vstim signal with multiple pulse trains each having a fixed number of pulses, each pulse train having a different frequency Fstim (e.g. 140 kHz, 200 kHz, and 260 kHz). With multiple pulse trains at different frequencies, one or more results can be obtained at each frequency. If a static interferer is present at a particular frequency, the results at that frequency can be corrupted as compared to the results obtained at the other two frequencies, and those results can be eliminated. The results at the remaining two frequencies can be averaged to compute the result.

In some embodiments, N columns of the multi-touch sensor panel can be connected to one analog channel via N:1 demultiplexer. A given row would then have to be stimulated N times to acquire Csig for all columns and then repeated for the other two frequencies. This has the advantage that fewer channels are needed but it takes longer to process an image. In other embodiments, one channel can be allotted for each column. A given row only has to be stimulated once to acquire Csig for all columns and then repeated for the other two frequencies. This arrangement has the advantage that it is faster then the previous arrangement described earlier; however, it takes more dedicated channels, which can be necessary for large multi-touch panels and when communications are USB, which could drop packets if too slow. After an entire "image" is captured, it can be processed. In further embodiments, multiple stimuli (scan circuits) can be applied to different rows at the same time to speed up the process. Fstim can be programmable. In some embodiments, a lookup table can be used to synthesize a demodulation waveform. The feedback capacitance Cfb and offset can also be programmable.

As mentioned above, the electrical characteristics of the sensors (pixels) in a sensor panel are likely to vary due to processing variations, manufacturing tolerances, assembly differences (which can be due to the location of the sensors in relation to the edges and shape of the sensor panel), aging, stress, dirt, moisture, deformation due to pressure, temperature, expansion of materials and geometries, and the like. For example, variations in the etching pattern for the ITO, variations in the dielectric constant of the glass substrate, the presence of microbubbles in the laminated stackup of materials that form the sensor panel, routing differences in traces on the panel and flex circuits connecting to the panel, or differences in the dielectric constant of the cover layer, can affect the magnitude of the analog channel output values from location to location within the sensor panel, and from panel to panel.

Thus, it is desirable to account for sensor panel variations by calibrating the pixels in a sensor panel such that for a given amount of touch, the analog channel ADC outputs will behave similarly. However, calibrating the sensor panel by taking steady-state measurements of the analog channel ADC outputs within the panel subsystem and comparing them to some pre-delivery baseline value presents some difficulties in that it is not possible to determine whether the differences are due to variations in the sensor panel or variations in the panel subsystem.

Figure 4:
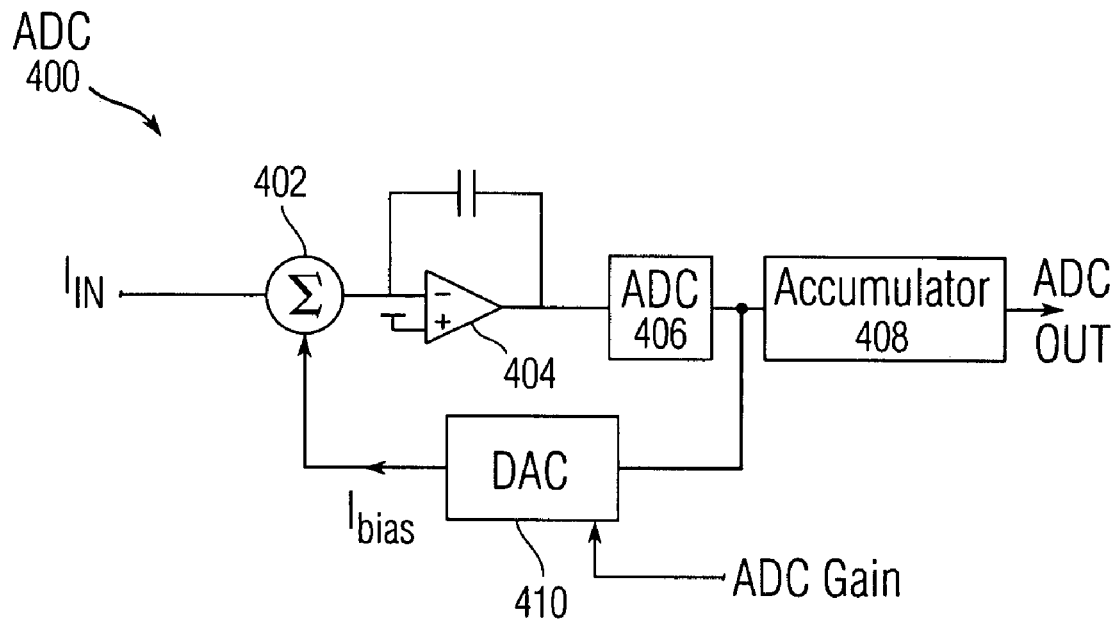
FIG. 4 illustrates an exemplary analog-to-digital converter (ADC) in an analog channel in the panel subsystem according to one embodiment of this invention.

FIG. 4 illustrates exemplary ADC 400 in an analog channel in the panel subsystem according to embodiments of the invention. (Note that ADC 400 corresponds to ADC 308 in FIG. 3a.) In ADC 400 of FIG. 4, Vin can be fed into summing circuit 402, which can then feed sigma-delta converter 404, which integrates Iin. This integrated Iin can be fed into ADC 406, which can then be accumulated in accumulator 408. The output of ADC 406 can also be fed back using DAC 410 which can generate an Ibias current that can be a function of temperature. Ibias can be a function of temperature because as temperature increases, electron-hole pairs in a semiconductor are created, mobility and conductivity increases, leakage current is created, and thus Ibias increases. Because the leakage current can be integrated along with Ibias, as the temperature changes, the baseline ADC output can drift. Therefore, changes to the analog channel ADC outputs as compared to some pre-delivery measured baseline can be due to temperature changes in the panel subsystem and not to variations in the sensor panel. A methodology is therefore needed for identifying differences between the analog channel ADC outputs and a pre-delivery measured baseline that can be attributed to variations in the sensor panel.

Figure 5:
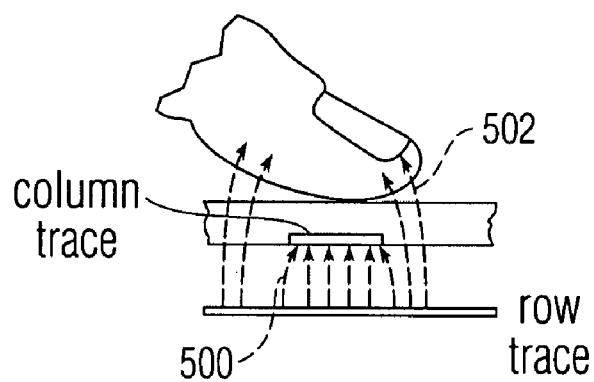
FIG. 5 is a side view of the exemplary capacitive touch sensor or pixel in a dynamic (touch) condition according to one embodiment of this invention.

As discussed above, when Vstim is applied to a particular row of the multi-touch sensor panel, the analog channels connected to the columns respond to the signal charge Qsig through the signal capacitance Csig for each pixel. The basic equation is $Qsig=Csig*Vstim$. However, when a finger touches down over a pixel in a full-touch condition, as illustrated in FIG. 5, the signal capacitance of that pixel can be reduced by $\Delta Csig$ due to the blocking of electric field lines between the rows and columns. In other words, $Csig\_static=Csig-\Delta Csig$, where $Csig\_static$ can be generated by electric field lines 500 within the panel that cannot be blocked by a finger, and $\Delta Csig$ can be generated by electric field lines 502 that leave the panel and are capable of being blocked by a finger. Similarly, the signal charge can also be reduced by $\Delta Qsig$. In other words, $Qsig\_static=Qsig-\Delta Qsig$, where $Qsig\_static$ can be the charge generated by electric field lines within the panel that cannot be blocked by a finger, and $\Delta Qsig$ can be the charge generated by electric field lines that leave the panel and are capable of being blocked by a finger. Therefore, the basic equation becomes $Qsig-\Delta Qsig=(Csig-\Delta Csig)*Vstim$, and $\Delta Qsig$ can be represented as $\Delta Qsig=\Delta Csig*Vstim$. $\Delta Qsig$ can be detected by the analog channel and produces a current full scale ADC output range of FS_targ_current.

Note, however, that the same change in signal charge $\Delta Qsig$ and the same current full scale ADC output range of FS_targ_current can be generated by changing the amplitude of Vstim instead of a finger touch. When Vstim is lowered with no finger touching and therefore no change in Csig (Csig is constant), there are less and/or weaker electric field lines, which has an effect similar to blocking the electric field lines using a finger. Therefore, the change in the signal charge $\Delta Qsig$ can be equivalently represented as $\Delta Qsig=Csig*\Delta Vstim$, which defines the same full scale ADC output range FS_targ_current as with a finger touch.

Changing the Vstim amplitude can be used to emulate sensor panel types when testing the panel subsystem. By changing the Vstim amplitude, it is possible to emulate the $\Delta Qsig$ that would result from different amounts of finger touch on different types of sensor panels having different types of traces (Indium Tim Oxide (ITO), copper, etc.), different stray capacitances, and different nominal signal capacitance (Csig) values. For example, suppose that the panel subsystem is to be characterized for several different sensor panel types, each of which has traces of different widths and materials that generate a different $\Delta Qsig$ for the same amount of touch. However, further suppose that the test system only includes a generic sensor panel, and that there is no access to the different sensor panel types. To emulate different types of sensor panels without actually using that type of sensor panel in the test system, Vstim can be changed to produce the same $\Delta Qsig$ that would have been produced if the particular type of sensor panel was in the test system.

Embodiments of the invention change the Vstim amplitude to assist in calibration of the touch panel. Changing the amplitude of Vstim can be advantageous because Vstim can be generated within a closed-loop system which can include driver logic, a high-voltage driver, the sensor panel, the analog channels and the channel scan logic, any of which the analog portions, such as the sensor panel, can change over time and influence how Vstim affects $\Delta Qsig$ and therefore the output of the analog channel ADC. Accordingly, by changing Vstim and measuring the output of the analog channel ADC, sensor panel degradation due to aging, stress, dirt, moisture, deformation due to pressure, temperature, expansion of materials and geometries, and the like can be detected, all of which affect the closed loop system. After this sensor panel degradation is detected, the sensor panel can effectively be calibrated by tuning the analog channel (e.g. by changing the feedback capacitance Cfb in the pre-amplifier of each analog channel or the gain of the sigma-delta converter) so that each analog channel will produce normalized results.

The full-scale target FS_targ, which is the full range of the analog channel ADC output, is caused by ΔQsig. FS_targ usually changes slowly as panel conditions change, and therefore the changes can be calibrated out. By changing the amplitude of Vstim and seeing how ΔQsig and therefore the full scale ADC output (FS_targ) changes, in theory it is possible to detect changes to both the panel subsystem and the sensor panel. However, during the calibration procedure according to embodiments of the invention, the temperature will effectively remain constant, and any changes seen at the ADC should be due to the sensor panel, not the panel subsystem. In other words, changing Vstim eliminates effects caused by the panel subsystem (which are mainly due to temperature drift, and therefore won't appear during the calibration procedure), and enables sensor panel effects to be detected and corrected by changing the ADCs to account for these panel effects.

To perform sensor panel calibration using a modulated Vstim, a baseline full scale ADC output (FS_targ_cal) is measured at pre-delivery for each pixel using a test fixture that is capable of applying a no-touch to full-touch condition to each pixel in the sensor panel given a nominal Vstim amplitude either one pixel at a time or multiple pixels at a time. The FS_targ_cal values for each pixel in the sensor panel can be stored in EEPROM or other nonvolatile memory accessible to the panel processor and panel subsystem.

Next, the full-touch condition can be emulated for each pixel by determining an amplitude for Vstim under no-touch conditions that will produce an analog channel ADC output of FS_targ_cal. This can be performed in different ways. In one embodiment, for each pixel, and under no-touch conditions, Vstim can be lowered using the DAC (see DAC 140 in FIG. 1) until FS_targ_current=FS_targ_cal. The Vstim amplitude level that produced FS_targ_cal is referred to as Vstim_cal.

In another embodiment, it is known that when Vstim_cal is applied and FS_targ_current=FS_targ_cal, then ΔQsig_cal (the ΔQsig due to Vstim_cal) is equal to ΔQsig due to full-touch. Accordingly, Csig*(Vstim_cal)=(Csig−ΔCsig)*Vstim, and $$Vstim\_cal=((Csig-\Delta Csig)*Vstim)/Csig.$$

Because each of the terms on the right side of this equation can be determined for each pixel during calibration before customer delivery, such as at the factory, Vstim_cal can be computed for each pixel. For example, Vstim can be known because a particular Vstim is used during pre-delivery calibration, and ΔCsig_cal and Csig_cal (the ΔCsig and Csig values during pre-delivery calibration) for each pixel can be derived from no-touch and full-touch measurements during pre-delivery calibration (at which time access is available to different registers, panel data, calibration data, etc.).

In either of these two approaches, a potentially different Vstim_cal value must be determined for each pixel in the sensor panel. An EEPROM or other nonvolatile memory can be used to store the Vstim_cal values for all pixels, and all of the calibration data for a given sensor panel and panel subsystem.

Figure 6:
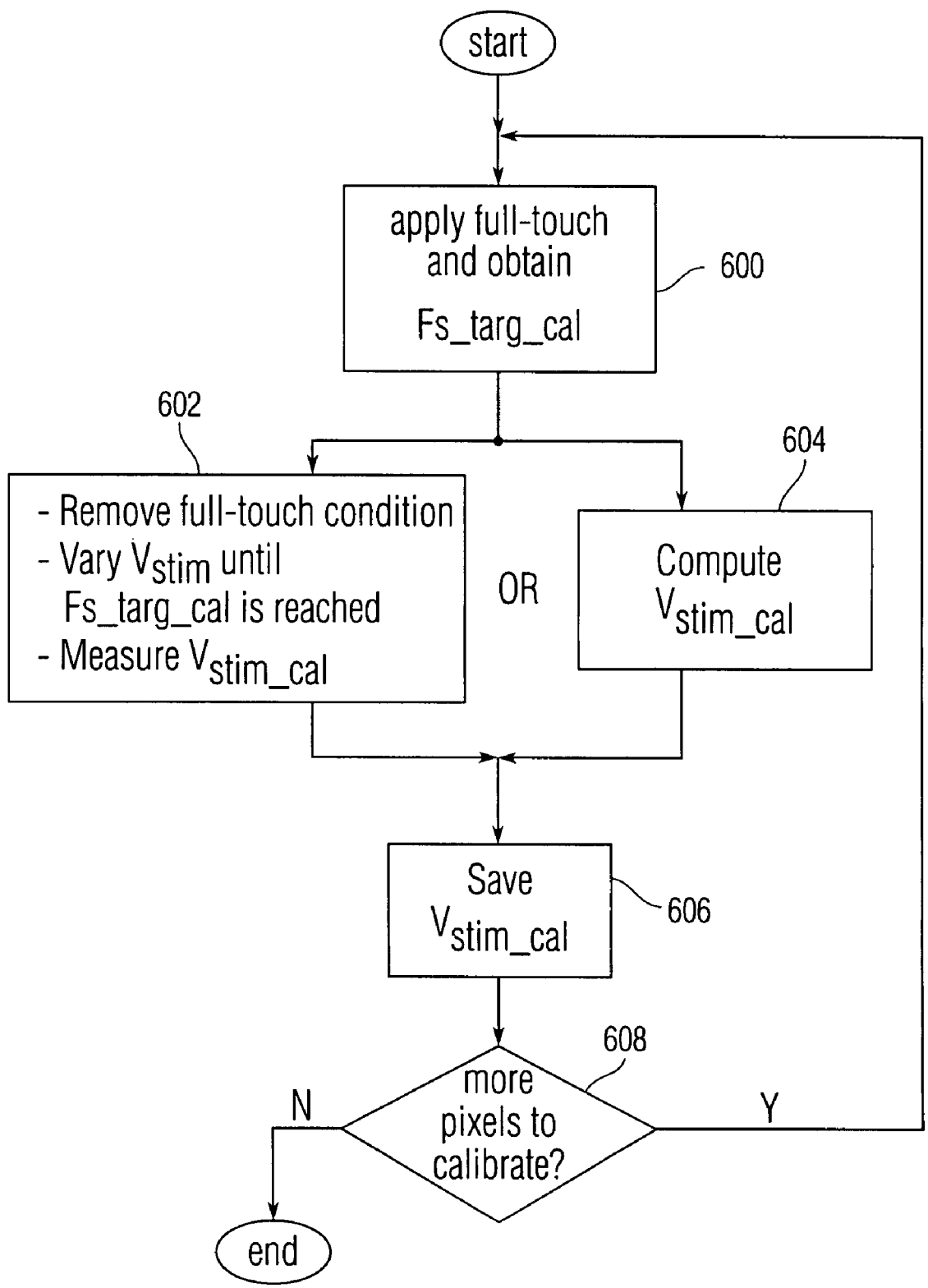
FIG. 6 is a flowchart of the process employed during calibration before customer delivery, such as at the factory, for determining Vstim_cal for each pixel according to embodiments of the invention.

FIG. 6 is a flowchart of the process employed during pre-delivery calibration for determining Vstim_cal for each pixel according to embodiments of the invention. In block 600, a baseline full scale ADC output (FS_targ_cal) can be measured prior to customer delivery, such as at the factory, for a particular pixel using a test fixture capable of applying a no-touch to full-touch condition to each pixel in the sensor panel given a nominal Vstim amplitude. In block 602, a full-touch condition can be emulated by lowering Vstim until FS_targ_current=FS_targ_cal as described above, and determining Vstim_cal accordingly. In block 604, which is an alternative to block 602, Vstim_cal can be computed using the equation Vstim_cal=((Csig−ΔCsig)*Vstim)/Csig as described above. In block 606, Vstim_cal can be saved for use during field calibration. Block 608 determines whether more pixels need to be subject to pre-delivery calibration. If there are no more pixels to be calibrated, the pre-delivery calibration process ends. If more pixels need pre-delivery calibration, the process repeats for the next pixel.

During field calibration, Vstim can be set to Vstim_cal to simulate a full-touch condition, and FS_targ_current can be obtained and compared against FS_targ_cal. Ideally, FS_targ_cal should equal FS_targ_current. However, the two values may not be equal because FS_targ_current is affected by (1) temp, (2) panel geometry (due to temperature effects, deformation, aging), (3) panel contaminants (e.g. dirt on panel surface, humidity, etc.), (4) panel subsystem specifics (e.g. temperature, noise), and other factors as described above.

Each analog channel can then be tuned such that when a full-touch condition is thereafter applied to a particular pixel by a user during normal use, the resultant FS_targ_current will approximately equal FS_targ_cal. Any method known to those skilled in the art can be used to tune the analog channels such that FS_targ_current will approximately equal FS_targ_cal.

Figure 7:
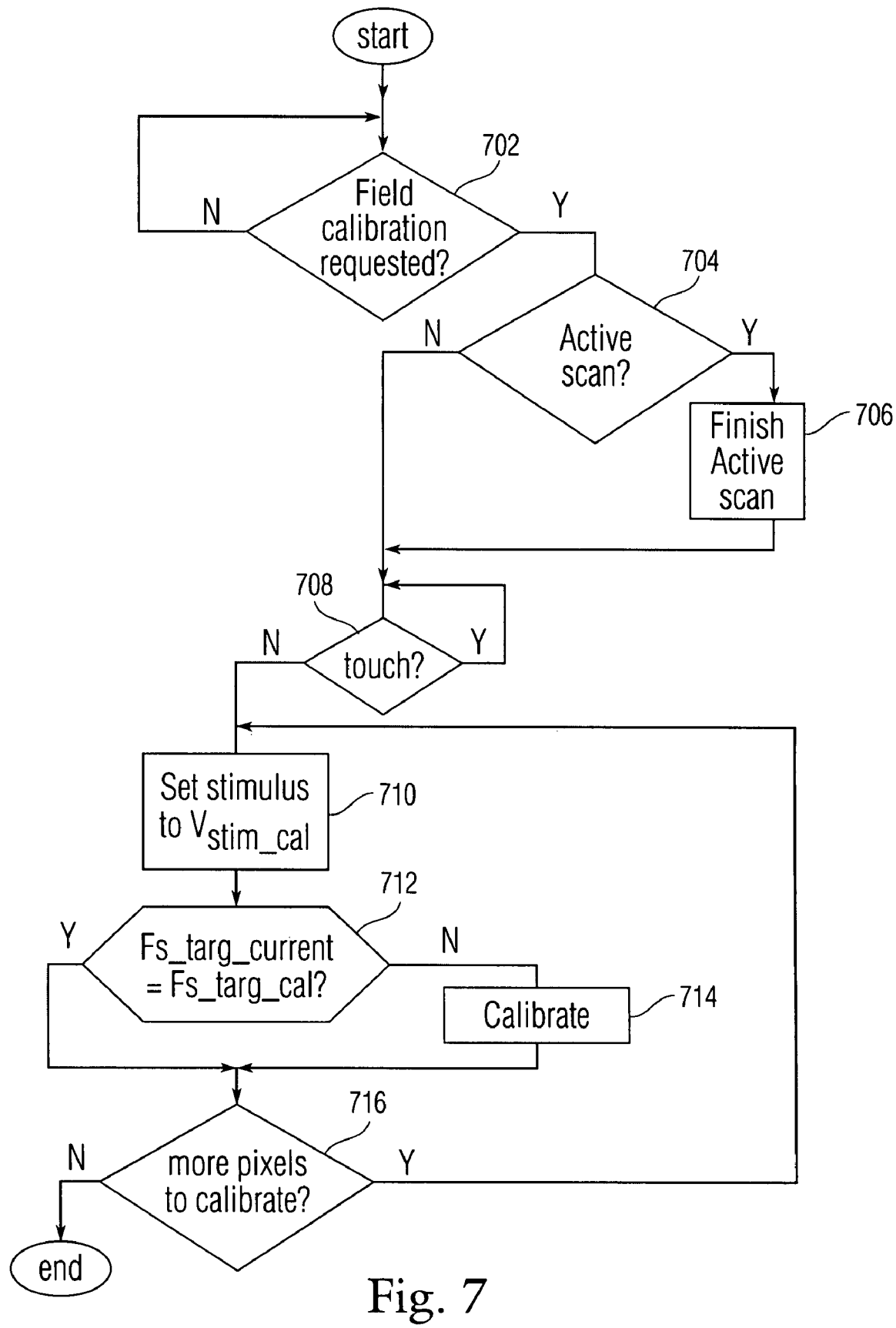
FIG. 7 is a flowchart of the process employed during field calibration of the sensor panel according to one embodiment of this invention.

FIG. 7 is a flowchart of the process employed during field calibration of the sensor panel according to embodiments of the invention. First, block 702 determines whether field calibration is being requested. Note that field calibration can be requested by the panel processor either at regular intervals or if certain conditions are detected (e.g. certain temperature thresholds are crossed), and can also be manually requested by a user. If field calibration is requested, then block 704 determines whether an active scan is being performed to capture an image of touch, if any. If active scanning is occurring, then the active scan process is allowed to complete at block 706, and field calibration does not commence until the active scanning is complete. If active scan is not occurring, or when active scan is completed, block 708 then determines whether any pixel on the sensor panel is being touched. As long as a touch is detected, field calibration is not initiated.

Only after a no-touch condition for all pixels in the sensor panel is detected does field calibration commence at block 710. For each pixel, the stimulus can be changed to the Vstim_cal setting associated with that pixel using the DAC. Next, block 712 determines whether the currently measured full scale analog channel DAC output FS_targ_current is equal to the pre-delivery measurement of FS_targ_cal. If the two values are equal, then no field calibration is needed. If the two values are not equal, then field calibration can be performed at block 714. If, after performing field calibration in block 714 or determining that no field calibration is needed, block 716 determines that there are more pixels to be subject to field calibration, then the field calibration process repeats.

Field calibration can be performed by tuning the analog channel circuitry in any number of ways such that the same amount of touch will produce the same FS_targ value. An increase in FS_targ could be indicative of a change in the mechanical/dielectric properties of the dielectrics in the sensor panel due to environmental conditions (temperature, moisture, contamination, etc.) and/or mechanical deformation and aging of the sensor panel. For example, if the dielectric constant of the spacer material changed, electric field lines associated with Csig and ΔCsig would be affected and so would the parameter FS_targ.

It should be understood, however, that because the same analog channel circuitry can be used to measure all pixels in one or more columns, field calibration involves storing the per-pixel information needed to tune the analog channel circuitry when an active scan is being performed on that pixel. When the field calibration process is completed and an active scan is being performed, the per-pixel information is retrieved and used to tune the analog channel at the proper time so that normalized pixel measurements are obtained.

For example, field calibration can be performed by tuning the feedback capacitance Cfb of the charge amplifier in an analog channel in accordance with the difference between FS_targ_current and FS_targ_cal. Control information can therefore be stored on a per-pixel basis and later used during an active scan to apply the proper Cfb to the charge amplifier in the analog channel circuitry. However, it should be noted that in such an exemplary embodiment, the value of Cfb that can be generated by the control information can be limited to a range of discrete values that might not precisely match the desired Cfb as computed.

Figure 8:
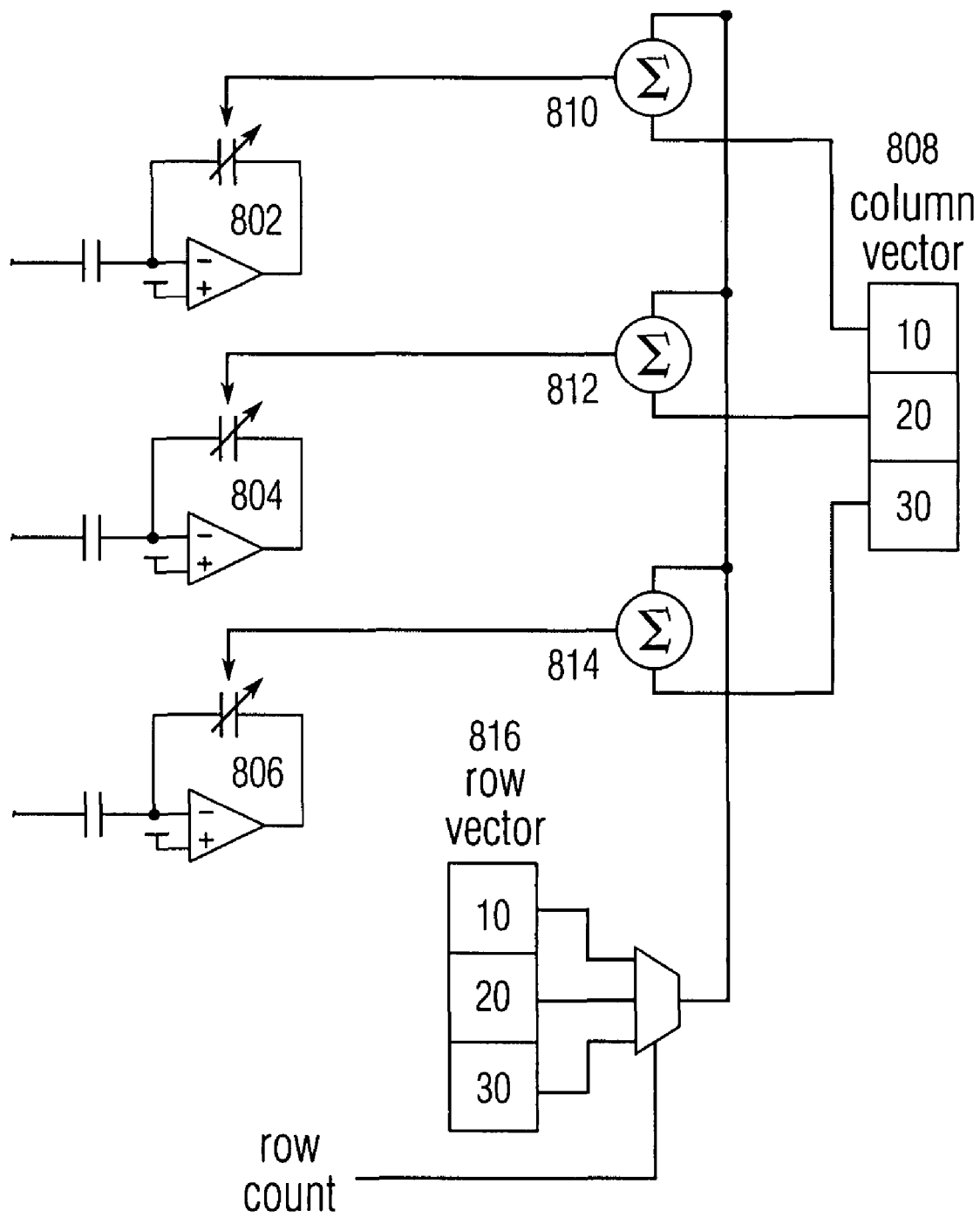
FIG. 8 illustrates an exemplary architecture for adjusting the Cfb values of the charge amplifiers in multiple analog channels to calibrate an attached sensor panel according to one embodiment of this invention.

FIG. 8 illustrates an exemplary architecture for adjusting the Cfb values of the charge amplifiers in multiple analog channels to calibrate an attached sensor panel according to embodiments of the invention. In particular, FIG. 8 illustrates a simple exemplary three row, three column (and therefore three analog channel amplifier), nine pixel sensor panel embodiment in which a Vstim applied to one of the rows can be coupled into three charge amplifiers 802, 804 and 806 of the three analog channels connected to the three columns. In the embodiment of FIG. 8, instead of being able to store control information sufficient to specify nine different values for the three Cfb capacitors, one for each pixel, there are only six selectable values to store and choose from, a combination of which will be used to generate an approximation for the nine desired Cfb values. Column vector 808 stores three digital control values in this simple embodiment, and each value can be applied to adders 810, 812 and 814 of a particular analog channel. In addition, row vector 816 also stores three digital control values in this simple embodiment, any of which can be selectively applied in accordance with the row count to adders 810, 812. Together, the sum of the control values from column vector 808 and row vector 816 determine Cfb for a particular charge amplifier. This methodology also works because the distribution of Csig across a panel is usually a first order (i.e. linear) function such as a ramp or second order function such a parabolic function.

During field calibration, Vstim_cal can be applied to the rows, one row at a time, and for each pixel, FS_targ_current can be compared to FS_targ_cal. If there is a difference, then based on the difference a new value Csig_current for that pixel can be calculated and based on the Csig_current value a new value for the preamplifier feedback capacitance Cfb is derived and temporarily stored in a two dimensional array, representing a one to one mapping between Cfbs and pixels. In order to conserve memory, the Cfb per pixel values are not stored on a per pixel basis but rather in a row and column vector. For example in FIG. 8, the row and column vectors only store six values whereas a per-pixel adjustment would require a memory that can store nine values. After all pixels are scanned, Cfb column vector control values and row vector control values can be found using a two-dimensional linear or non-linear regression process that will produce Cfb values relatively close to the desired Cfb values for each pixel. After that, the calibration process is complete. The same process as described above can also be applied to the offset and ADC gain parameters.

Thus, in the example of FIG. 8, Cfb of charge amplifier 802 can be configured by control values of 20, 30 or 40 only, representing three different capacitances, while Cfb of charge amplifier 804 can be configured by control values of 30, 40 or 50 only, representing three different capacitances, and Cfb of charge amplifier 806 can be configured by control values of 40, 50 or 60 only, representing three different capacitances. Generating a particular value based on row and column vector control values is described in Applicant's U.S. patent application Ser. No. 11/650,203 entitled "Individual Channel Phase Delay Scheme, filed on Jan. 3, 2007, the contents of which are incorporated by reference herein.

During pre-delivery calibration, the stimulus voltage can be varied until the full scale ADC output value is FS_targ_cal, or $$FS\_targ\_cal * aq = Csig\_cal * (Vstim\_cal), \quad \text{(Eq. 1)}$$

wherein parameter aq (charge per ADC count) relates an ADC count to a charge value, and Csig_cal is the Csig value present during pre-delivery calibration.

During device operation, Csig_cal can change by dCsig_cal to Csig_current, and ΔCsig_cal can change by dΔCsig_cal to ΔCsig_current. Panel deformation, humidity, temperature variations and aging can affect the chemical composition and/or mechanical characteristics of the panel dielectrics and ITO conductors resulting in a change of Csig_cal and ΔCsig_cal. For example, changing the dielectric constant of the spacer between the row and column electrodes will have an effect on the electric field lines associated with Csig_cal but also ΔCsig_cal. If the ratio Css between Csig_cal and ΔCsig_cal is assumed to be approximately constant, then any change dCsig_cal will have an associated change:

$$dΔCsig\_cal = Css * dCsig\_cal.$$

When performing a field or operational calibration of the operating device, the full scale ADC output value FS_targ_current can be represented as:

$$FS\_targ\_current * aq = Csig\_current * (Vstim\_cal), \quad \text{(Eq. 2)}$$

wherein Csig_current is the Csig value present during field (operational) calibration, and is given as Csig_current=Csig_cal+dCsig_cal.

Combining (Eq. 1) and (Eq. 2) yields:

$$FS\_targ\_cal/FS\_targ\_current = (Csig\_cal * (Vstim\_cal))/((Csig\_cal + dCsig\_cal) * (Vstim\_cal)), \quad \text{(Eq. 3)}$$

and solving for dCsig_cal yields:

$$dCsig\_cal = Csig\_cal * ((FS\_targ\_current/FS\_targ\_cal) - 1). \quad \text{(Eq. 4)}$$

Using parameter Css, the approximate error dΔCsig_cal in ΔCsig_cal can be calculated as:

$$dΔCsig\_cal = Css * dCsig\_cal = Css * Csig\_cal * ((FS\_targ\_current/FS\_targ\_cal) - 1).$$

The static portion of the error Csig_stat_current=dCsig_cal−dΔCsig_cal needs to be compensated by adjusting the amount of offset compensation via the DAC (see DAC 320 in FIG. 3a):

$$dVoff = VOFF\_cal * Csig\_stat\_cal/(Csig\_stat\_cal - Csig\_stat\_current),$$

wherein VOFF_cal is the calibrated offset value. The dynamic portion of the error needs to be adjusted by adjusting the gain in the ADC (see ADC 308 in FIG. 3a):

$$dGain = ADCGAIN\_cal * \Delta Csig\_cal/(\Delta Csig\_cal - d\Delta Csig\_cal),$$

wherein ADCGAIN_cal is the calibrated ADC gain value.

In alternative embodiments of the invention, during pre-delivery calibration a plurality of calibration parameters can be measured for a nominal stimulus level Vstim and one or more multiple reduced stimulus levels Vstim_cal or Vstim_cal[ ] (a vector), respectively, assuming single and/or multiple touch and/or no-touch condictions. During the field calibration process, when the device is in an operational state, a plurality of field parameters are measured for a nominal stimulus level Vstim and one or multiple reduced stimulus levels Vstim_cal or Vstim_cal[ ], respectively, assuming single and/or multiple touch and/or no-touch conditions. Suitable gain and offset values are then arrived at by applying a correction to the calibrated gain and offset values. The amount of correction can be derived by correlating the measured pre-delivery calibration parameters to the measured field calibration parameters using lookup tables and/or interpolation and/or extrapolation techniques.

Figure 9:
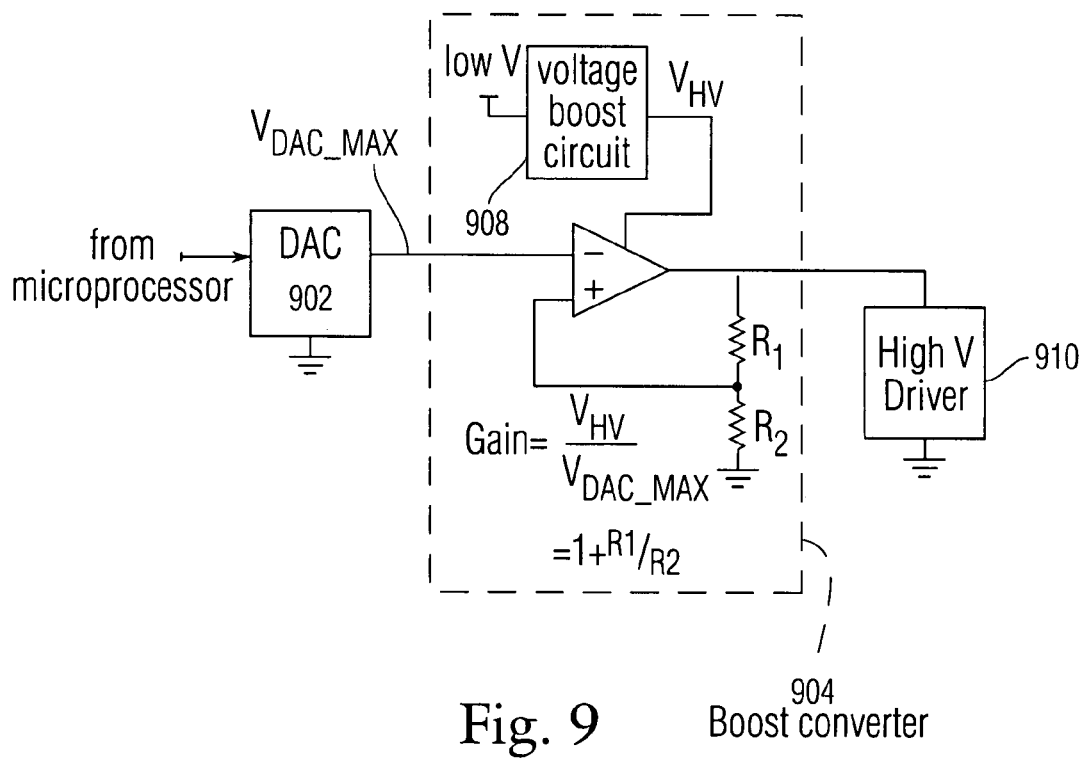
FIGS. 9 and 10 illustrate exemplary circuits for driving the high voltage driver according to one embodiment of this invention.
Figure 10:
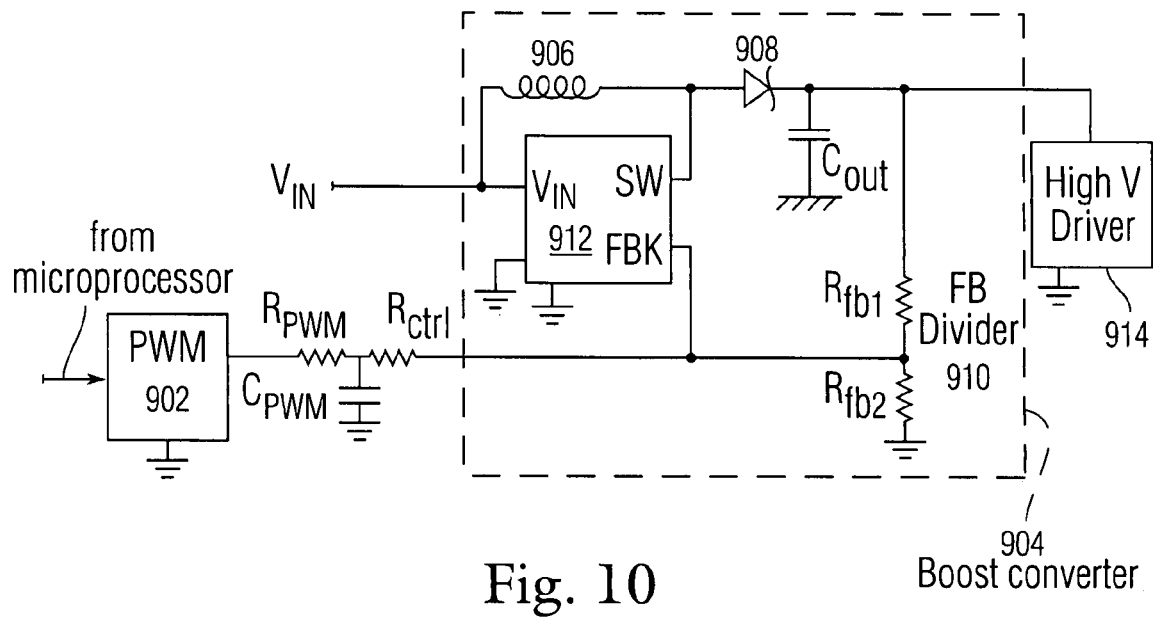

FIGS. 9 and 10 illustrate exemplary circuits for driving the high voltage driver according to embodiments of the invention. FIG. 9 shows DAC 902 either internal or external to the panel subsystem that generates an analog voltage of between zero and Vdac_max (e.g. 2.56V) to boost converter 904. Amplifier 906 within boost converter 904 receives its supply voltage from voltage boost circuit 908 that boosts a lower voltage up to Vhv (e.g. 18V). Amplifier 906 also receives Vdac_max as an input and generates an output of 0 to 18 V with a gain equal to Vhv/Vdac_max=1+Rfb1/Rfb2 to high voltage driver 910. FIG. 10 shows pulse width modulator (PWM) 902 (which replaces the DAC of FIG. 9) that generates a control voltage to boost converter 904. The RC that can include Rpwm and Cpwm generates an analog value between 0 and Vref of the boost converter, the series resistor Rctrl induces a current Ipwm=(Vref−Vpwm)/Rctrl into the feedback pin of the boost converter causing the voltage at the output of the boost converter to be Vboost out=Vref+Rfb1*((Vref−Vpwm)/Rctrl+Vref/Rfb2). Boost converter 904 can include inductor 906, Schottky diode 908 and feedback divider 910. PWM 902 modulates feedback divider 910 to produce different output voltages. When switch 912 is turned on, current through inductor 906 rises linearly and the inductor stores energy. When switch 912 is turned off, the inductor current tries to maintain its direction, the magnetic field collapses, and Schottky diode 908 transfers that energy to output capacitor Cout and high voltage driver 914.

Figure 11A:
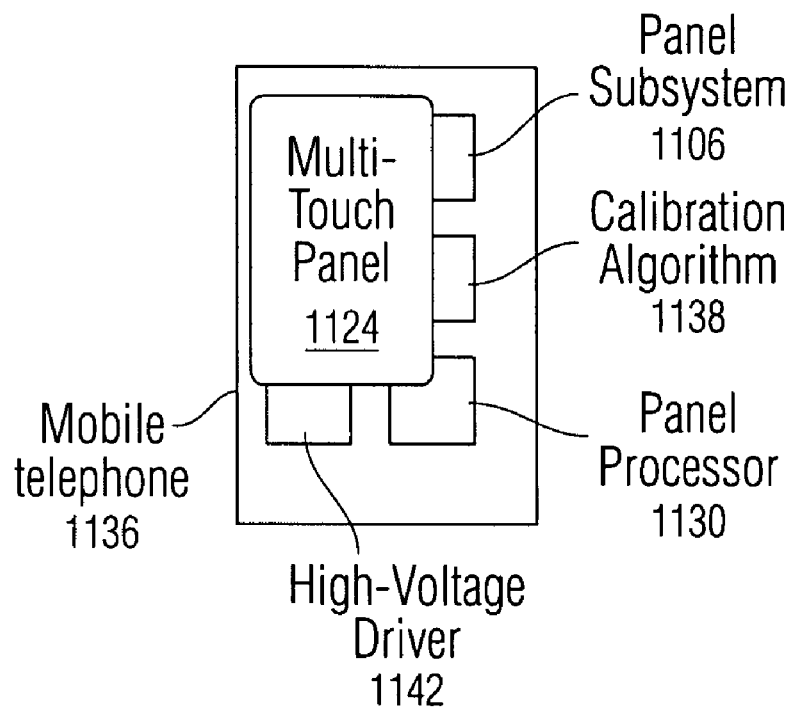
FIG. 11a illustrates an exemplary mobile telephone including the calibration algorithm according to one embodiment of this invention.
Figure 11B:
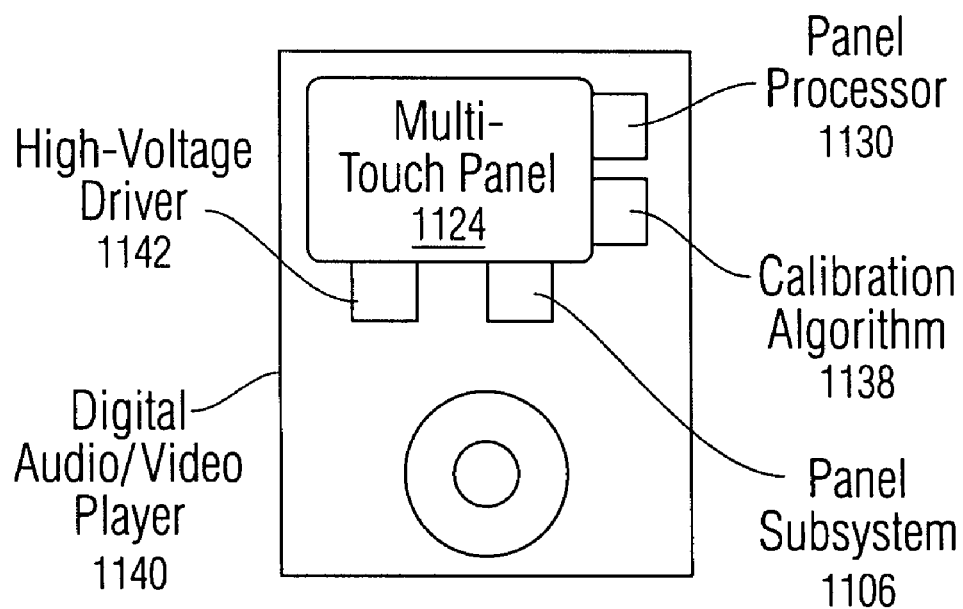
FIG. 11b illustrates an exemplary digital audio/video player including the calibration algorithm according to one embodiment of this invention.

FIG. 11a illustrates exemplary mobile telephone 1136 that can include multi-touch panel 1124, panel subsystem 1106, calibration algorithm 1138, panel processor 1130 and high-voltage driver 1142 configured for implementing the calibration procedures described above according to embodiments of the invention. FIG. 11b illustrates exemplary digital audio/video player 1140 that can include multi-touch panel 1124, panel subsystem 1106, calibration algorithm 1138, panel processor 1130 and high-voltage driver 1142 configured for implementing the calibration procedures described above according to embodiments of the invention. The mobile telephone and digital audio/video player of FIGS. 11a and 11b can advantageously benefit from calibration because without it, the sensors within the multi-touch sensor panel can generate different output values, which can cause inconsistent or false triggering of virtual buttons or non-triggering of virtual buttons, and a difficult user experience as the user discovers that certain areas of the sensor panel require more or less touching, or closer or farther hovering in order to trigger a virtual button.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for determining a stimulus voltage for a capacitive touch sensor that simulates a touch on the sensor for use in calibrating the sensor, comprising:
   during pre-delivery calibration,
      applying a predetermined touch to the sensor;
      determining a touch calibration output value from an analog channel coupled to the sensor; and
      with no touch applied, determining a stimulus voltage at which the output value from the analog channel is approximately equivalent to the touch calibration output value.

2. The method of claim 1, wherein determining the stimulus voltage comprises applying the stimulus voltage to the sensor and varying the stimulus voltage until a simulated touch output value of the sensor is approximately equivalent to the touch calibration output value.

3. The method of claim 1, wherein determining the stimulus voltage comprises subtracting a change in a touch signal capacitance of the sensor from a no-touch signal capacitance of the sensor to form a first intermediate result, multiplying the first intermediate result by a nominal stimulus voltage amplitude value to form a second intermediate result, and dividing the second intermediate result by the no-touch signal capacitance of the sensor.

4. A method for calibrating a capacitive touch sensor, comprising:
   during field calibration,
      applying a predetermined stimulus voltage to the sensor, the predetermined stimulus voltage selected to cause a simulated touch output value of an analog channel coupled to the sensor to be approximately equivalent to a predetermined touch calibration output value;
      measuring the simulated touch output value of the analog channel; and
      tuning the analog channel in accordance with any difference between the simulated touch output value and the touch calibration output value.

5. The method of claim 4, wherein tuning the analog channel comprises tuning a feedback capacitor in accordance with a difference between the simulated touch output value and the touch calibration output value.

6. The method of claim 4, wherein calibration of the sensor commences after any active scanning and touching of the sensor has ceased.

7. A method for calibrating a capacitive touch sensor, comprising:
   applying a nominal stimulus voltage amplitude value and one or more reduced stimulus voltage amplitude values to the sensor;
   measuring a plurality of field parameters after application of the nominal stimulus voltage amplitude value and the one or more reduced stimulus voltage amplitude values;
   correlating the plurality of field parameters to a plurality of calibration parameters obtained during a pre-delivery calibration phase by applying the nominal stimulus voltage amplitude value and the one or more reduced stimulus voltage amplitude values to the sensor, the field and calibration parameters being of a same type but having potentially different values;

applying a correction to calibrated gain and offset values of an analog channel coupled to the sensor, the correction derived from the correlation of the field parameters to the calibration parameters.

8. The method of claim 7, further comprising correlating the field parameters and the calibration parameters using lookup tables.

9. The method of claim 7, further comprising correlating the field parameters and the calibration parameters using extrapolation.

10. The method of claim 7, further comprising correlating the field parameters and the calibration parameters using interpolation.

11. An apparatus for calibrating a capacitive touch sensor, comprising:
  non-volatile memory storing a stimulus voltage amplitude value at which a simulated touch output value of a capacitive touch sensor is approximately equivalent to a touch calibration output value; and
  a processor coupled to the non-volatile memory and programmed for applying the stimulus voltage amplitude value to a drive line containing the sensor and obtaining a current simulated touch output value from an analog channel connected to a sense line containing the sensor, and tuning the analog channel in accordance with any difference between the current simulated touch output value and the touch calibration output value.

12. The apparatus of claim 11, the processor further programmed for withholding calibration until any active scanning and touching of the sensor has ceased.

13. The apparatus of claim 11, the processor further programmed for tuning the analog channel by tuning a feedback capacitor in accordance with a difference between the current simulated full-touch output value and the touch calibration output value.

14. The apparatus of claim 11, further comprising a panel subsystem coupled to the apparatus, a high-voltage driver coupled to the panel subsystem, and a host processor coupled to the processor.

15. The apparatus of claim 14, further comprising a mobile telephone that incorporates the computing system.

16. The apparatus of claim 15, further comprising a digital audio player that incorporates the computing system.

17. An apparatus for calibrating an output value of a capacitive touch sensor, comprising:
  non-volatile memory storing a stimulus voltage amplitude value at which a simulated touch output value of the sensor is approximately equivalent to a touch calibration output value; and
  a processor coupled to the non-volatile memory and programmed for
    applying the stimulus voltage amplitude value to a drive line containing the sensor and obtaining a current simulated touch output value from an analog channel connected to a sense line containing the sensor,
    comparing the current simulated touch output value to the touch calibration output value, and
    if the current simulated touch output value range is not approximately equal to the touch calibration output value, tuning the analog channel to make the current simulated touch output value approximately equal to the touch calibration output value.

18. The apparatus of claim 17, the processor further programmed for withholding calibration until any active scanning and touching of the sensor has ceased.

19. The apparatus of claim 17, the processor further programmed for tuning the analog channel by tuning a feedback capacitor in accordance with a difference between the current simulated touch output value and the touch calibration output value.

20. A portable computing device including an apparatus for calibrating a capacitive touch sensor, the apparatus comprising:
  non-volatile memory storing a stimulus voltage amplitude value at which a simulated touch output value range of the sensor is approximately equivalent to a touch calibration output value; and
  a processor coupled to the non-volatile memory and programmed for applying the stimulus voltage amplitude value to a drive line containing the sensor and obtaining a current simulated touch output value from an analog channel connected to a sense line containing the sensor, and tuning the analog channel in accordance with any difference between the current simulated touch output value and the full touch calibration output value.

21. An apparatus for determining a stimulus voltage for a capacitive touch sensor that simulates a touch on the sensor for use in calibrating the sensor, comprising:
  means for applying a predetermined touch to the sensor;
  means for determining a touch calibration output value from an analog channel coupled to the sensor; and
  means for determining, with no touch applied, a stimulus voltage at which the output value from the analog channel is approximately equivalent to the touch calibration output value.

22. A computer-readable storage medium comprising program code for determining a stimulus voltage for a capacitive touch sensor that simulates a touch on the sensor for use in calibrating the sensor, the program code for causing performance of a method comprising:
  during pre-delivery calibration,
    applying a predetermined touch to the sensor;
    determining a touch calibration output value from an analog channel coupled to the sensor; and
    with no touch applied, determining a stimulus voltage at which the output value from the analog channel is approximately equivalent to the touch calibration output value.

* * * * *

UNITED STATES PATENT AND TRADEMARK OFFICE
CERTIFICATE OF CORRECTION

PATENT NO.        : 7,920,134 B2                              Page 1 of 1
APPLICATION NO.   : 11/818263
DATED             : April 5, 2011
INVENTOR(S)       : Cristoph Horst Krah It is certified that error appears in the above-identified patent and that said Letters Patent is hereby corrected as shown below:

In column 17, line 38, in Claim 13, delete "full-touch" and insert -- touch --, therefor.

In column 18, line 32, in Claim 20, after "the" delete "full".

Signed and Sealed this
Twenty-ninth Day of November, 2011

David J. Kappos
*Director of the United States Patent and Trademark Office*